# United States Patent Office 3,148,221
Patented Sept. 8, 1964

3,148,221
2-METACHLOROPHENYL-2-PARACHLORO-PHENYL-1,1-DICHLOROETHANE
John Marshall Nichols, 8008 Reed Road,
Prairie Village, Kans.
No Drawing. Filed Sept. 9, 1959, Ser. No. 838,834
1 Claim. (Cl. 260—649)

The object of my invention is the creation of a chemical compound which when administered to animals or humans will result in a state of glandular hypofunction and more specifically hypofunction of the adrenal cortex and/or pituitary glands. Such a compound may be an important tool in the experimental investigation of the relationships of the several glands of mammals and may also be useful in the therapy of the diseases of these glands or conditions associated with the functioning of these glands.

PRIOR ART

It has been reported that the commercially available preparations of the insecticide DDD, or TDE, or Rhothane (2,2 - bis(parachlorophenyl) - 1,1-dichloroethane) causes atropy and hypofunction of the adrenal cortex, but this effect is specific for the canine species. Clinical trials in the human with this technical compound have been equivocal. It has been subsequently demonstrated that an isomer, o,p' - DDD (2 - orthochlorophenyl-2-parachlorophenyl-1,1-dichloroethane), found as a "contaminant" in the technical grade material is active in causing this adrenal atrophy and hypofunctioning in the dog.

The specific object of this present invention is the creation of a novel isomer of DDD, viz., 2-metachlorophenyl-2-parachlorophenyl-1,1-dichloroethane.

The starting compounds are well known commercially available chemicals and the techniques employed are standard chemical manipulations. Thus, a Grignard is prepared from metabromochlorobenzene using ordinary laboratory glassware and the usual precautions associated with this type of reaction. The resulting compound is reacted with dichloroacetaldehyde and the product decomposed with ammonium chloride. The carbinol is distilled and reacted with an excess of chlorobenzene in the presence of a dehydrating agent, e.g., sulphuric acid. The acid is separated, the organic layer washed, and the solvents evaporated. The product is extracted with petroleum ether and the final compound precipitated in a cold chest. The following example illustrates a specific procedure for preparing the compounds of the invention.

*Example 1*

To a dry, three neck, five liter flask fitted with a dropping funnel, sealed stirrer and an efficient condenser is added 65 grams (2.7 moles) of dry magnesium turnings. Five-hundred grams of anhydrous diethylether is added thru the dropping funnel. This is followed by 411 grams (2.14 moles) of metabromochlorobenzene dissolved in 1,500 grams of diethylether. After about 50 grams of the bromochlorobenzene is added the addition is stopped and the well-stirred mixture brought to gentle reflux with a heating mantle. The condenser is cooled with ice-water. The reaction usually begins within about 30 minutes whereupon heating is discontinued and an ice-bath applied. The remainder of the bromochlorobenzene is added as fast as the capacity of the condenser permits. After the addition is complete the stirring is continued and the mixture maintained at gentle reflux for an hour.

At the end of this time the ice-bath is reapplied and when the mixture is chilled 250 grams (2.2 moles) of dichloroacetaldehyde dissolved in 400 grams of diethylether is added thru the dropping funnel as fast as the capacity of the condenser permits. After the addition is complete the ice-bath is removed and the well-stirred mixture is maintained at gentle reflux overnight (10 hours). The chilled reaction mixture is next decomposed by the careful addition of 400 ml. of 25% aqueous ammonium chloride. The mixture is allowed to stand for an hour and the organic layer is siphoned off. The salt cake is four times successively washed with 500 gram portions of petroleum ether (30–60° C.) The five ether portions are combined and the solvents evaporated at 100° C./30 mm. On second distillation 157 grams of metachlorophenyldichloromethylcarbinol is obtained at 115–118° C./ 3 mm. The yield is 32% of theory.

*Analysis.*—Calculated for $C_8Cl_3H_7O$: C, 43.05; Cl, 47.63; H, 3.17; O, 7.11. Found: C, 43.47; Cl, 47.20; H, 3.37; O, 7.01. $d_{22}^{22°}=1.4368$, $n_D^{24}=1.5679$.

One hundred and fifty grams of metachlorophenyldichloromethylcarbinol (0.66 mole) is mixed with 74 grams (0.66 mole) of chlorobenzene and chilled in an ice-bath. This mixture is slowly added to a well-stirred chilled mixture of 450 grams of sulphuric acid (sp. gr. 1.84) and 74 grams of chlorobenzene. Stirring is continued for an hour while the mixture is surrounded by the ice-bath, and further continued for a second hour at room temperature. The mixture is then poured onto 1,000 grams of chipped ice in a 2 liter separatory funnel. The acid is discarded and the organic layer extended with 500 grams of petroleum ether (30–60° C.). The organic layer is twice washed with water, once with 2% sodium carbonate solution and four times with water. The ether and reactants are evaporated at 100° C./3 mm. leaving 174 grams of black tarry mixture. The reaction mixture is returned to the 2 liter separatory funnel and successively extracted eight times with 1,000 gram portions of petroleum ether (30–60° C.) while the funnel is held under the hot water tap and the mixture brought to boiling. The ether portions are combined and upon cooling to 5° C. in a cold room an amber viscid liquid separates and which is discarded. The ether volume is reduced to 1,500 ml. with negative pressure and returned to a 2 liter separatory funnel which is placed in a Dry-Ice chest (−70° C.) overnight (10 hours). After removal from the Dry-Ice chest the product is seen to have formed white crystals and the bottom of the funnel contains a few ml. of light amber fluid. When the material reaches room temperature the amber fluid has increased in volume, the crystals redissolved and the ether solution to have become whiter. This process is repeated until the ether layer has become white and no more amber fluid forms to be drawn off. This usually requires 8–10 cold precipitations, the last of which is conducted in a 2 liter balloon flask and which is allowed to remain in the Dry-Ice chest for 5 days. The ether of the final precipitation is drawn off and the flask with the crystals inverted and attached to a vacuum pump. The pressure is reduced to 3 mm. and the flask allowed to come to room temperature. The product, 2-metachlorophenyl-2-parachlorophenyl-1,1-dichloroethane, is a white amorphous powder which weighs 41 grams. Microscopic examination of this powder shows it to be composed of fine needles which melt at 54° C. The yield is 19% of theory.

*Analysis.*—Calculated for $C_{14}Cl_4H_{10}$: C, 52,53; Cl, 44.34; H, 3.12. Found: C, 52.77; Cl, 44.20; H, 3.19.

It is to be understood that this invention is not to be limited to the exact details of operation as described because obvious modifications and equivalents will be apparent to one skilled in the art and the invention is therefore to be limited only by the scope of the appended claim.

I claim:

2 - metachlorophenyl-2-parachlorophenyl-1,1-dichloroethane.

References Cited in the file of this patent

UNITED STATES PATENTS

| | | |
|---|---|---|
| 2,464,600 | Meitzner | Mar. 15, 1949 |
| 2,503,915 | Majewski | Apr. 11, 1950 |

OTHER REFERENCES

Haller et al.: Jour. Amer. Chem. Soc., vol. 67 (1945), 1591–1602 (12 pages).

Nelson et al.: "Arch. Path.," vol. 48 p. 387 (1949)

Sheehan et al.: "Lancet," vol. 1 p. 312 (1953).

Nichols et al.: "Expt. Med. Surg." vol. 15, p. 310. (1957).

Moon: "The Adrenal Cortex," chapter 5, Paul B. Hoeber, Inc., Medical Division of Harper and Brothers, publishers (1961).